(12) United States Patent
Faenger

(10) Patent No.: US 8,494,439 B2
(45) Date of Patent: Jul. 23, 2013

(54) APPLICATION STATE AND ACTIVITY TRANSFER BETWEEN DEVICES

(75) Inventor: Jens Faenger, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 12/773,238

(22) Filed: May 4, 2010

(65) Prior Publication Data

US 2011/0275358 A1 Nov. 10, 2011

(51) Int. Cl.
*H04H 40/00* (2008.01)

(52) U.S. Cl.
USPC ..... 455/3.06; 455/41.2; 455/41.3; 455/414.1; 455/556.1; 455/556.2; 455/557; 455/569.1; 455/569.2; 455/418; 455/419; 455/420; 709/212; 709/217; 709/218; 709/227; 340/425.2; 340/426.16; 340/426.2; 340/431; 340/433; 340/434

(58) Field of Classification Search
USPC .................. 455/3.06, 41.1, 41.2, 41.3, 414.1, 455/556.1, 556.2, 557, 569.1, 569.2, 575.9, 455/418, 419, 420; 709/212, 217, 218, 227, 709/FOR. 119; 340/425.5, 426.2, 426.22, 340/431, 433, 434, 426.16
See application file for complete search history.

(56) References Cited

U.S. PATENT DOCUMENTS

| | | | |
|---|---|---|---|
| 7,406,294 B1 * | 7/2008 | Liu | 455/3.06 |
| 7,818,403 B2 * | 10/2010 | Alrabady et al. | 709/219 |
| 2004/0214525 A1 * | 10/2004 | Ahn et al. | 455/41.2 |
| 2006/0256074 A1 | 11/2006 | Krum et al. | |
| 2008/0305738 A1 * | 12/2008 | Khedouri et al. | 455/3.06 |
| 2009/0275318 A1 * | 11/2009 | Lee et al. | 455/418 |
| 2010/0062714 A1 * | 3/2010 | Ozaki | 455/41.3 |

FOREIGN PATENT DOCUMENTS

| | | |
|---|---|---|
| EP | 1215575 A2 | 6/2002 |
| EP | 1760584 A1 | 3/2007 |
| WO | 2005109829 A1 | 11/2005 |
| WO | 2006028520 A1 | 3/2006 |

* cited by examiner

*Primary Examiner* — Olumide T Ajibade Akonai

(57) ABSTRACT

A method of operating a personal electronic device and an in-vehicle infotainment system includes running an application on one of the personal electronic device and the in-vehicle infotainment system. It is sensed that the personal electronic device has been, or soon will be, moved into or out of a proximity of the in-vehicle infotainment system. Information regarding a state of the one of the personal electronic device and the in-vehicle infotainment system is transferred to the other of the personal electronic device and the in-vehicle infotainment system. An application is selected for the other of the personal electronic device and the in-vehicle infotainment system. The selected application is used to replicate the state of the one of the personal electronic device and the in-vehicle infotainment system on the other of the personal electronic device and the in-vehicle infotainment system.

6 Claims, 7 Drawing Sheets

APPLICATION STATE AND ACTIVITY TRANSFER BETWEEN DEVICES

BACKGROUND OF THE INVENTION

1. Field of the Invention

The present invention relates to in-vehicle infotainment systems, and, more particularly, to in-vehicle infotainment systems used in conjunction with mobile phones.

2. Description of the Related Art

State of the art smartphones and other types of mobile devices offer a wide range of applications to the user. Many of those applications rely on databases inside or outside the mobile phone. For example, phone or email applications use an address book, and music applications access the information stored in a music collection.

State of the art in-vehicle infotainment systems (IVI) are able to access those databases in the mobile phone by using wireless or wired connections. In order to use, for example, the contact list, the calendar or the music collection stored in the mobile phone, the in-vehicle system has to provide applications that are capable of using that data. Thus, applications that are available on the mobile phone are replicated with similar applications running on the in-vehicle system. For example, an in-vehicle music player is needed to play the music stored in the phone. As another example, an email program running in the in-vehicle system is required to access the phone's address book.

The benefit of using the data of the mobile phone with applications running in the in-vehicle system is that those in-vehicle applications are specifically designed and adapted to the car environment. For example, the functionality and user interface/input controllers of in-vehicle applications are designed for use while driving. Applications in the mobile phone, on the other hand, are usually not designed for use within the car and often do not make allowances for reductions in the driver's attention due to his having to divide his attention between the driving task and operating the applications on the phone.

But state of the art in-vehicle systems do not have knowledge of what the user was doing with his mobile phone before entering the car. State of the art in-vehicle systems do not know what applications the user was using on his mobile phone and what information he entered in those applications. That leads to the situation that a driver needs to manually start applications in the in-vehicle system and then needs to enter the same information again into these applications in order to reproduce the state of the mobile phone. This necessity of manually starting applications in the in-vehicle system and then re-entering information is time consuming and distracts the driver from his driving task if performed while the car is moving.

What is neither disclosed nor suggested by the prior art is an in-vehicle infotainment system that has improved integration with a mobile phone such that the above-described disadvantages can be avoided.

SUMMARY OF THE INVENTION

The present invention may enable an in-vehicle infotainment system to interact with mobile phones. The invention may make it possible to transfer the state of the mobile phone and its usage history to the in-vehicle system and visa versa. This state transfer may include information about active applications and recent user input, translated into activities. Everything the user has done on the phone in the immediate past may then be replicated by the in-vehicle system, thereby enabling the user to stop using the mobile phone and instead continue the activity with the in-vehicle system.

The invention enables a user to make a seamless transition between using the mobile phone and the in-vehicle system. The invention provides both the mobile phone and the in-vehicle system with functionality to transfer application states and the usage history between the mobile phone and the in-vehicle system. Thus, the driver is enabled to continue activities with his in-vehicle system that were originally initiated on the mobile phone before he entered the car. In addition, the invention also enables the sharing of system states in the opposite direction. That is, when the driver has arrived at his destination, all the inputs made into the in-vehicle system during the trip may be transferred to the phone. This enables the user to continue his electronic activities after leaving the car. While the invention is described herein as primarily pertaining to the data exchange between a mobile phone and an in-vehicle system, the invention is also applicable to other devices such as computers, portable navigation systems, televisions and radios.

The invention comprises, in one form thereof, a method of operating a personal electronic device and an in-vehicle infotainment system, including running an application on one of the personal electronic device and the in-vehicle infotainment system. It is sensed that the personal electronic device has been, or soon will be, moved into or out of a proximity of the in-vehicle infotainment system. Information regarding a state of the one of the personal electronic device and the in-vehicle infotainment system is transferred to the other of the personal electronic device and the in-vehicle infotainment system. An application is selected for the other of the personal electronic device and the in-vehicle infotainment system. The selected application is used to replicate the state of the one of the personal electronic device and the in-vehicle infotainment system on the other of the personal electronic device and the in-vehicle infotainment system.

The invention comprises, in another form thereof, a method of operating a personal electronic device and an in-vehicle infotainment system, including running an application on the personal electronic device. It is automatically sensed that the personal electronic device has been, or soon will be, carried into a vehicle that includes the in-vehicle infotainment system. Information regarding a state of the personal electronic device is transferred to the in-vehicle infotainment system. The transferring is performed in response to the automatically sensing step. An application is selected for the in-vehicle infotainment system dependent upon the transferred information. The selected application is used to replicate the state of the personal electronic device on the in-vehicle infotainment system.

The invention comprises, in yet another form thereof, a method of operating a personal electronic device and an in-vehicle infotainment system, including running an application on one of the personal electronic device and the in-vehicle infotainment system. Information regarding the running of the application is displayed on a display screen of the one of the personal electronic device and the in-vehicle infotainment system. The personal electronic device and the in-vehicle infotainment system are positioned such that the display screen of the one of the personal electronic device and the in-vehicle infotainment system is disposed within a field of view of an optical sensor of the other of the personal electronic device and the in-vehicle infotainment system. The optical sensor is used to capture at least one image of the display screen. The captured image is analyzed to thereby extract information regarding a state of the one of the personal electronic device and the in-vehicle infotainment system. An application is selected for the other of the personal electronic device and the in-vehicle infotainment system dependent upon the extracted information. The selected application is used to replicate the state of the one of the personal electronic device and the in-vehicle infotainment system on the other of the personal electronic device and the in-vehicle infotainment system.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
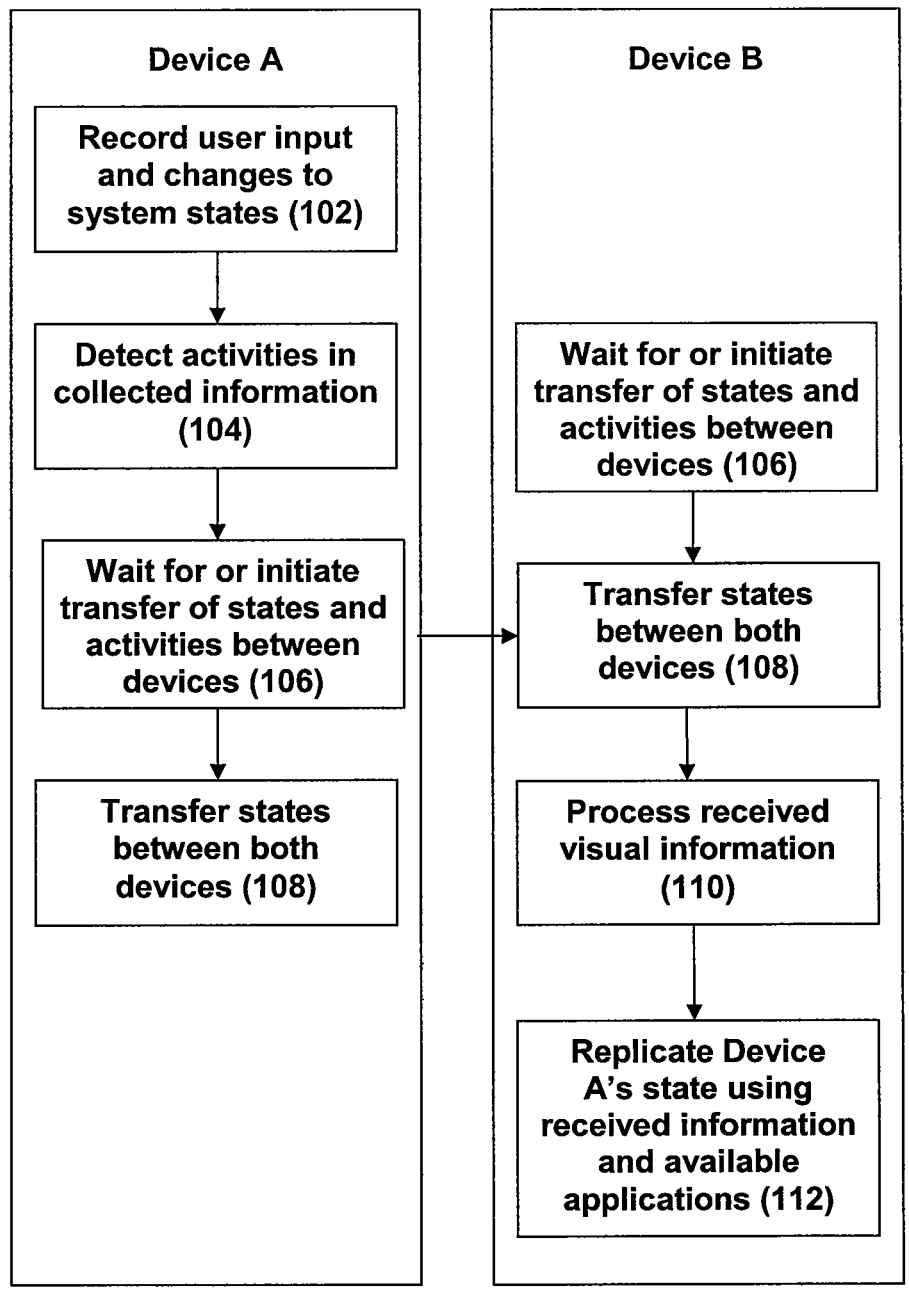
FIG. 1 is a flow chart illustrating one embodiment of a state transfer method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a state transfer method 100 of the present invention in which the state transfer takes place from a source device A to a target device B. Source device A is in a specific state after being operated by the user and this state may be transferred to and then replicated by target device B.

In a first step 102, inputs from the user as well as system and application states are collected and recorded within source device A. Source device A is the device that is currently being operated by the user. As used herein, "operating" a device may encompass, for example, the user changing settings on the device, starting applications, and making inputs into the applications. By performing any kind of input, the user may bring the device into a specific state. In order to replicate this state, one embodiment of the method of the invention may include keeping track of what the user is doing on source device A by recording all inputs made into source device A. Such inputs may include haptic inputs using pushbuttons, inputs on touch screens or via a mouse, voice inputs, and any other type of input. In one embodiment, one or both of source device A and target device B may use events or messages to internally handle inputs made by the user. The method of the invention may also include recording such events or messages.

If the input is performed by the user with a pointing device, such as a touch screen, mouse or arrow keys, the method of the invention may also include recording what input element is selected through the pointing operation and what the outcome of the selection is. For example, if the user presses a key on a virtual keyboard, the identity of the key as well as the letter produced as a result of the key being pressed may be recorded.

For each input, a record may be made of a timestamp, the application and the input element that received the input. The timestamp may identify the time of day that the input was made. Depending on the input element's type, additional information may be collected. For example, if the user selects a pushbutton, the pushbutton's state, its name or identity, and the pushbutton's internal identification (ID) may be recorded. If the input is in the form of the user typing text into an input field, the field's name, the field's internal ID, and the text input may be recorded. If the user selects a text element in a list, the name and ID of the list as well as the name and ID of the selected element may be recorded. For example, if the user selects an email address in a list, that email address may be recorded. More generally, the names and internal IDs of all elements that receive input may be recorded together with the input.

In another embodiment, the applications that are available on the device are also recorded. That is, the names and internal IDs of applications that are installed on the device may be recorded. Further, the identities of ones of these available applications that are currently running, and the order in which the applications are used, may also be recorded.

In addition to the user inputs, other information that relates to the application and the device state may also be recorded. For example, on many portable devices, applications store their application states in databases. This allows the devices to be terminated at any time and, upon restart, reproduce their last state. According to the invention, this mechanism may be used to learn about the application state and transfer the state to another device. In order to make use of the application state information, two different approaches may be used within the scope of the invention. First, instructions used by the device's operating system to write information into databases may be recorded. Second, such databases may be opened and read separately once the information has been written.

On most devices, the system of the invention introduces a component or extension to the operating system which enables a general purpose approach to recording user input and obtaining access to the databases. Some devices inhibit this approach as the operating system cannot be extended in the desired way or a new component cannot gather all the desired information from the applications and the operating system. In this case, all the recording of user input and access to database content takes place inside individual applications. While this approach may not allow transparent integration of the invention with all existing applications on the device, this approach may make it possible to obtain a deep and accurate understanding about a limited number of applications.

In a next step 104, activities in collected information are detected. Once the information is recorded, it may be processed and filtered. Information may be extracted from or added to the collected data to make it possible to robustly replicate the device's state on another device.

The user input may be analyzed in order to understand the activity the user is performing on the device. For example, if the user starts an application called "Messenger" and types an email address into the "To:" field, it may be inferred, according to the invention, that the user is "composing an email". If, on the other hand, the user uses the same "Messenger" application but types a number, it may be inferred, according to the invention, that the user is "composing a text message". State-of-the-art machine learning approaches such neural networks, Bayesian networks, decision graphs and semantic web technology may be used to determine which activity the user is performing.

In order to make the determination of what activity the user is performing, the user input may be categorized. Based on the name and ID of the application that receives user input, a list of activities that the user might possibly be performing may be narrowed down. For example, the application "Messenger" might allow the user to perform only the following activities: "compose email", "compose text message", "compose instant message". Thus, in one embodiment, these potential activities may be looked up in a database or knowledgebase that translates the name and ID of a known application into a list of potential activities.

The above-mentioned knowledgebase may also provide information related to what input was made into the application by translating names and IDs of input elements into an input category. For example, the "Messenger" application may display an input field named "To:" and another input field named "Subject:". By using the knowledgebase, the "To:" field may be translated into, or associated with, the more general category "recipient". Similarly, the knowledgebase may enable the "Subject:" field to be translated into, or associated with, the more general category "message topic". The resulting categories may be associated with the input that the original input elements received.

In addition to user input, generalized categories may also be assigned to application state information that is stored in application or system databases. For example, if the "Messenger" application stores an ID in its database that represents the type of the last message that was composed, this information can be used to help decide whether the user is composing an email or a text message. That is, if the user's last composed message was an email, then it may be more likely that the present message that the user is composing is an email. Similarly, if the user's last composed message was a text message, then it may be more likely that the present message that the user is composing is a text message. In another example, if the user is listening to an internet radio station, the application database might contain an entry that identifies the type and location (e.g., web address) of the station. These fields may then be assigned to the general categories "station type" and "station location", respectively.

Next, all the generalized input may be fed into an inference algorithm. Based on this input and the list of potential activities that can be performed in the specific application, the inference algorithm may determine which possible activity the user is most likely currently performing. The algorithm may then also receive all subsequent user inputs. The output of the algorithm may be an activity description such as "compose email; recipient—abc@xyz; message topic—Hi; message body—<empty>". The message body in this example is empty to indicate that the user has not entered information yet, which may further indicate that the activity is still ongoing.

After all activities have been determined, a usage history may be compiled based on the timestamps recorded in association with the respective user inputs. All activities that have taken place may be determined and put into chronological order. For example, a usage history may include a chronological list of activities such as "turn on radio", "switch to radio station", "compose email", etc.

Next, in step 106, each device may wait for or initiate a transfer of states and activities between the devices. The transfer may be a one way transfer or possibly a two way transfer. In a specific embodiment, step 106 includes initiating a state exchange between a mobile phone device and an in-vehicle system device.

Once the user enters or leaves the car, he may manually instruct the mobile phone and the in-vehicle system to exchange state information and activities. In order to initiate the exchange, a variety of approaches may be utilized within the scope of the invention. In a first approach, the user can manually initiate the state transfer by pressing a pushbutton in the in-vehicle system or in the mobile phone.

In a second approach, the exchange may be automatically initiated in response to the mobile phone being charged in the vehicle's electrical power outlet, or in response to the data cable being plugged into the mobile phone. The direction of transfer of state information may depend upon whether the data cable is being plugged into the phone or unplugged from the phone. For example, the data cable being plugged into the phone may be indicative of the phone being brought into the car, and thus in response, the state of the phone may be transferred to the car and replicated by the car. Conversely, if the data cable is unplugged from the phone, then it may be assumed that the phone is being removed from the car. Thus, in response, the state of the in-vehicle system may be transferred to the phone.

In a third approach, the user may manually initiate the data exchange by bumping or tapping the mobile phone against the housing of the in-vehicle system or against another active element in the car. A user of a portable device may initiate an exchange of information with a simple gesture, as described in detail in U.S. Patent Publication No. 2006/0256074, which is assigned to the assignee of the present application, and which is hereby incorporated by reference herein in its entirety.

In a fourth approach, the user may manually initiate the data exchange by holding the mobile phone in front of the in-vehicle system such that the camera of one of the devices can see and recognize the other device. In this approach, a camera attached to the in-vehicle system or to the mobile phone is monitoring the environment, looking for signs of the other device as indicated by tags attached to the device or to its screen such as barcodes or specific images. If the other device is found in the field of view of the camera, then the state exchange is started. If the camera of only one device sees the other device, this information may be used to decide the direction in which the state information is to be transferred. For example, if the user is holding the screen of the mobile phone in front of the in-vehicle camera, then state information may be transferred from the mobile phone to the in-vehicle system. If, on the other hand, the camera of the mobile phone is pointed towards the screen of the in-vehicle system, then the transfer of state information may be directed from the in-vehicle system to the mobile phone. This convention is arbitrary, however, as it is also possible in another embodiment for state information to be transferred from the in-vehicle system to the mobile phone if the user is holding the screen of the mobile phone in front of the in-vehicle camera, and for state information to be transferred from the mobile phone to the in-vehicle system if the camera of the mobile phone is pointed towards the screen of the in-vehicle system.

In a fifth approach, the exchange may be automatically initiated in response to one of the devices receiving a radio frequency beacon or other type of signal from the other device. In a proximity detection scheme, a first one of the devices scans for a known RFID tag, Bluetooth ID or WiFi address transmitted by a second one of the devices in an RF signal. If the first and second devices are within range of each other such that the first device can receive the second device's RF transmission, then the transfer of state information from the first device to the second device may be automatically initiated. In one embodiment, the first device is a mobile phone and the second device is an in-vehicle system. Thus, the user bringing the phone into the vehicle may result in an automatic transfer of the state information from the phone to the in-vehicle system. If an RFID tag was in reception range within the previous sixty seconds or so, but is no longer currently within range, then it is indicated that the user is leaving the car and the transfer of state information from the car to the phone may be initiated.

In a sixth approach, the mobile phone may be coupled with in-car sensors in order to enable the phone to detect whether the user is entering or leaving the car, and a transfer of state information from the phone to the car, or from the car to the phone, is automatically initiated accordingly. For example, if the car's ignition is turned on, an ignition sensor in the car transmits an "ignition on" signal to the phone, indicating that the user is entering or has entered the car, and a state information transfer from the phone to car may be initiated. Conversely, if the ignition is turned off, the ignition sensor in the car transmits an "ignition off" signal to the phone, indicating that the user is leaving the car, likely within about thirty seconds, and the state information may be transferred from the car to the phone. Other sensors that may be utilized in this approach may include seat occupancy sensors and door lock/unlock indicators, for example. The seat occupancy and door lock sensors may indicate that the user has entered or has left the vehicle, while the door unlock sensors may indicate that the user will soon enter or leave the car, likely within the next thirty seconds or so. A signal sent from a seat adjustment assembly in response to the assembly being actuated may also be used as an indication that the user has entered the car.

In a seventh approach, information about activities is permanently or continuously exchanged between devices in real time. For example, whenever an input is made on one of the two devices and the other device is within reception range, then the exchange of state information may be triggered.

In a next step 108, state information may be transferred between the two devices. Once the state information exchange has been triggered, traditional wired or wireless connections such as Bluetooth, WiFi or USB may be used to transfer the information about states and activities between the mobile phone and the in-vehicle system. In one embodiment, the information is encoded and transferred using XML or HTML together with attached Javascript. Using HTML with attached Javascript makes it possible to display the state information of one device on the other device's web-browser without requiring further components on that other device.

In addition, one embodiment of the invention utilizes a visual data exchange. A camera is attached to the in-vehicle system and monitors the environment in front of the in-vehicle system. When a user holds the screen of the mobile phone in front of the camera, the in-vehicle system can literally "see" what is currently going on in the mobile phone as displayed on the display screen of the mobile phone. The in-vehicle system may visually encode and transfer the information using tags, e.g., barcodes. Likewise, a camera attached to the mobile phone may be used to receive content from the in-vehicle system by capturing images displayed on the display screen of the in-vehicle system.

In step 110, the received visual information may be processed. A special case of the visual transfer includes transmitting the pure, unchanged content that is displayed on the screen. In this case, source device A does not add tags to the content which would help target device B understand what is displayed on the screen of source device A. Instead, target device B just captures an image of the screen content as the user sees it. Source device B may then analyze the content shown on the screen. Source device B may employ a range of image processing and image analysis technologies, including pattern, shape and object recognition as well as optical character recognition. By employing those processing steps, source device B develops an understanding or knowledge of what texts and what elements and shapes, such as pushbuttons or lists, are displayed on the screen.

Based on the collected information, target device B may infer or otherwise ascertain what application is most likely displayed on the screen of source device A. For this purpose, a knowledgebase may be used that associates typical text sequences with corresponding applications that might use those particular sequences. A similar approach may be used to associate typical shapes and screen elements with possible applications. Then, machine learning approaches such as neural networks, Bayesian networks or decision graphs may be employed to decide which application is currently running and visible on source device A. Once this decision is made, target device B may employ the steps described above in order to determine the activity that the user is currently performing, as well as the inputs that the user is providing for the identified activity.

In a final step 112, the state of source device A is reproduced or replicated on target device B. Once target device B knows about the current state and activities performed on source device A, target device B may replicate that state by using the received information regarding recorded activities. For each identified activity, target device B may search for an application that is able to reproduce this activity. For this purpose, target device B may rely on a knowledgebase that associates activities on source device A with applications that are installed on device B and that can handle or accommodate the identified activity. For example, the activity "compose email" might be performed with, and therefore associated with, the application "Email client". In some cases, more than one application might be available and capable of handling the same activity. In this case, a list of applications may be presented to the user, and the user may be prompted to select an application from the list. Alternatively, of the possible applications, the application that the user has used most frequently may be automatically selected. If this information regarding the particular user's most frequently used application is not available, then information about the popularity of each application among the general public, as is available in form of user ratings in online application stores of the device, may be used to select an application that the user is most likely using.

If, on the other hand, no application installed on the device can handle the identified activity, the knowledgebase may be used to find applications in the device's online application store which are able to handle the activity. An offer may then be made to the user to download and install one of those applications on the target device. Alternatively, if the state information was transferred using HTML with attached Javascript, then the device may use a web browser to display the states and activities. By relying on the attached Javascript, the web browser may enable the user to interact with the displayed information without requiring the user to install additional applications.

Once an application is identified as being able to handle the activity, then the activity is performed by the identified application. For this purpose, the generalized input categories determined on source device A may be translated back into specific input elements on target device B. The knowledgebase may provide information about that mapping and may also inform target device B how to enter the input into the input elements. For example, the knowledgebase might associate the general category "recipient" with an input field that has the name "To" or a specific internal ID. The name or ID may then be used to find this element in the application. Next, the input recorded for "recipient" may be automatically entered into this field. In addition to entering information into input elements of the application, the knowledgebase may inform target device B whether and how information that is associated with the state or activity is to be stored into an application or system database.

Figure 2:
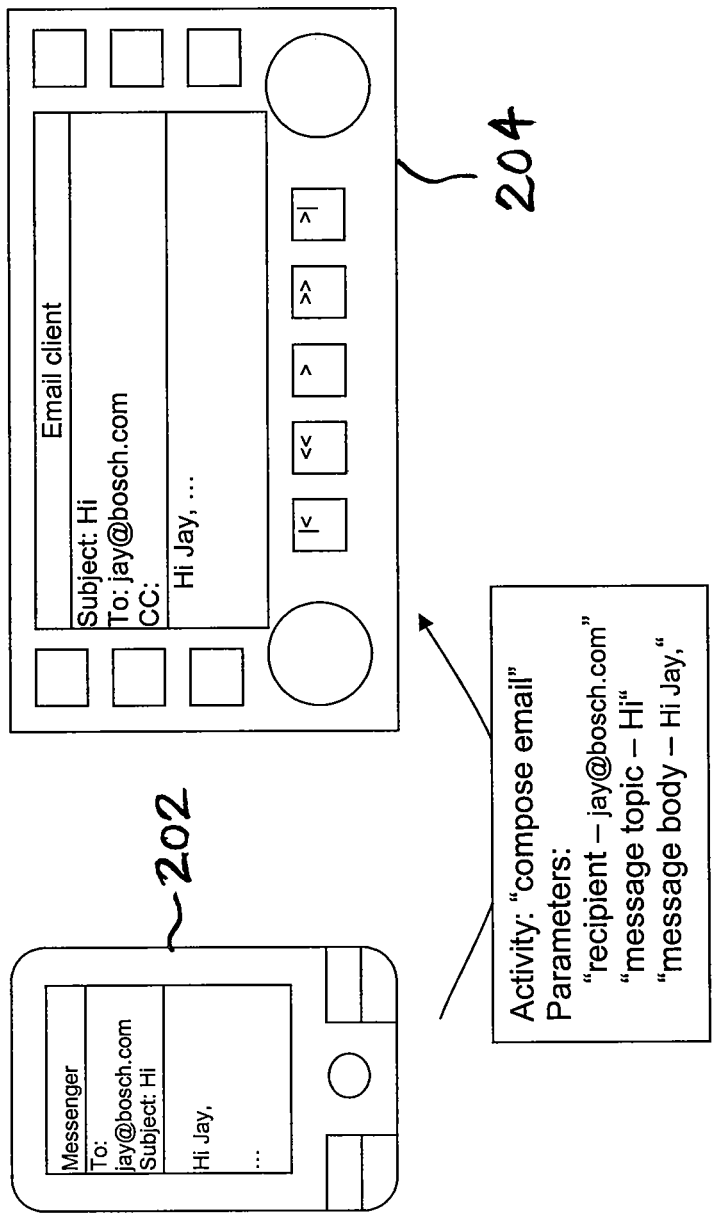
FIG. 2 is an illustration of the writing of an email started on a mobile phone being continued on an in-vehicle system according to one embodiment of the present invention.

As an example of how the system of the invention may be used, the system may enable a user who is writing an email on his mobile phone 202 (FIG. 2) to continue writing the email after he gets into the car by using the in-vehicle system 204. Assume the user entered text into the subject line and selected a recipient from the address book which is now displayed in the "To:" field. Further assume that the user also started entering text into the body of the email. The phone may keep track of all the inputs made by the user. Next, further assume that the user enters the car and initiates a state information transfer from the phone to the in-vehicle system by turning on the ignition, as described hereinabove. The activity and state information of the phone may be sent to the in-vehicle system using Bluetooth. Upon receiving the information, the in-vehicle system may open its email client and fill in the subject and recipient fields. The in-vehicle system may also enter the email content that the user started typing on the phone. Thus, the unfinished email gets displayed on the in-vehicle system, and the user can continue writing the email using the in-vehicle system's input and output devices.

Figure 3:
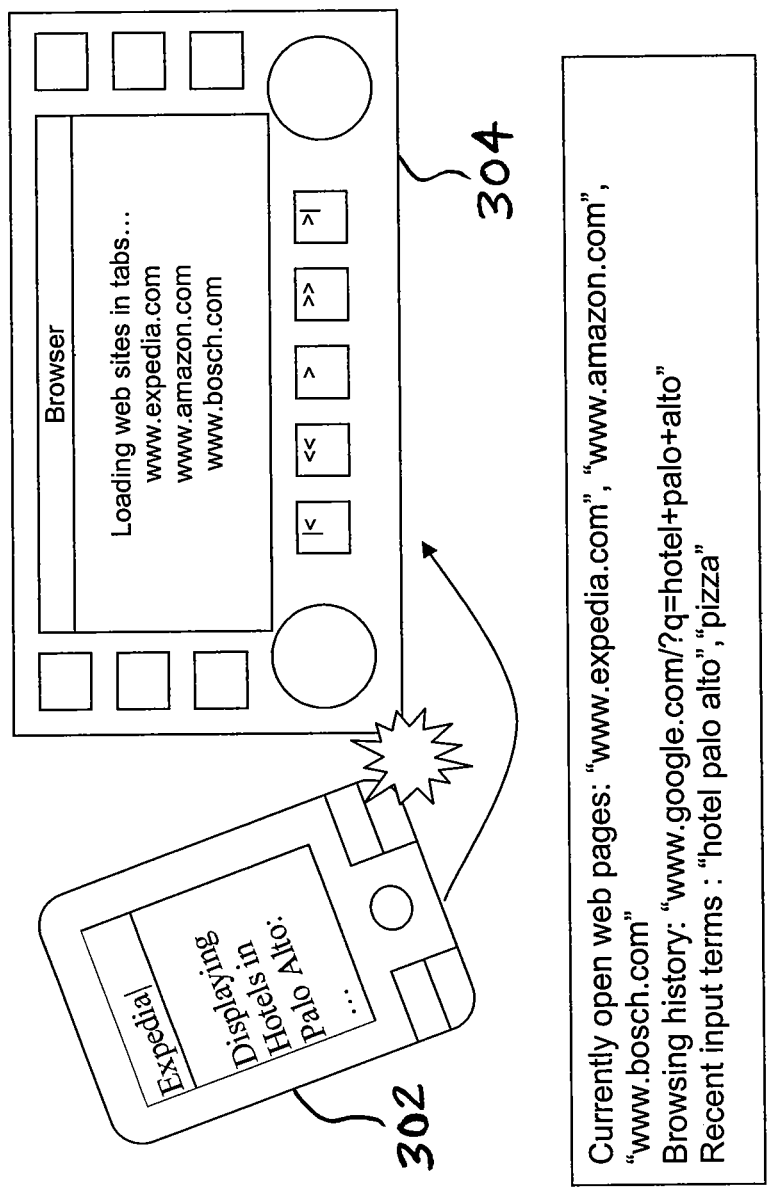
FIG. 3 is an illustration of web pages on a mobile phone being loaded onto an in-vehicle system according to one embodiment of the present invention.

As another example of how the system of the invention may be used, the system may enable a user to take web pages that are open on his mobile phone and load the open web pages into the in-vehicle system, as illustrated in FIG. 3. According to the invention, the applications that have been recently used on the mobile phone may be tracked. Most recently, in the example of FIG. 3, a web browser was used on mobile phone 302. The user opened three different tabs to look at different web pages (i.e., expedia.com, amazon.com, and bosch.com). Upon entering the car, the user may softly bump or tap phone 302 against the in-vehicle infotainment system 304. After the bump is sensed, the bump may be registered and a data transfer from the phone to the in-vehicle system may be initiated. Because the phone is assumed to have been used more recently than the in-vehicle system, the application states may be transferred from the phone to the in-vehicle system. In turn, the in-vehicle system may open its own web browser with three tabs and may load the web pages shown in FIG. 3 from the phone into the in-vehicle system. In addition, the in-vehicle system may also receive a list of search terms entered into the phone's web browser and a list of websites recently visited by the phone. Both the search terms and the websites may be used by the in-vehicle web browser to suggest terms whenever the user is entering text using the car's input controller. Thus, entering input into the in-vehicle system may be faster and more convenient for the user.

Figure 4:
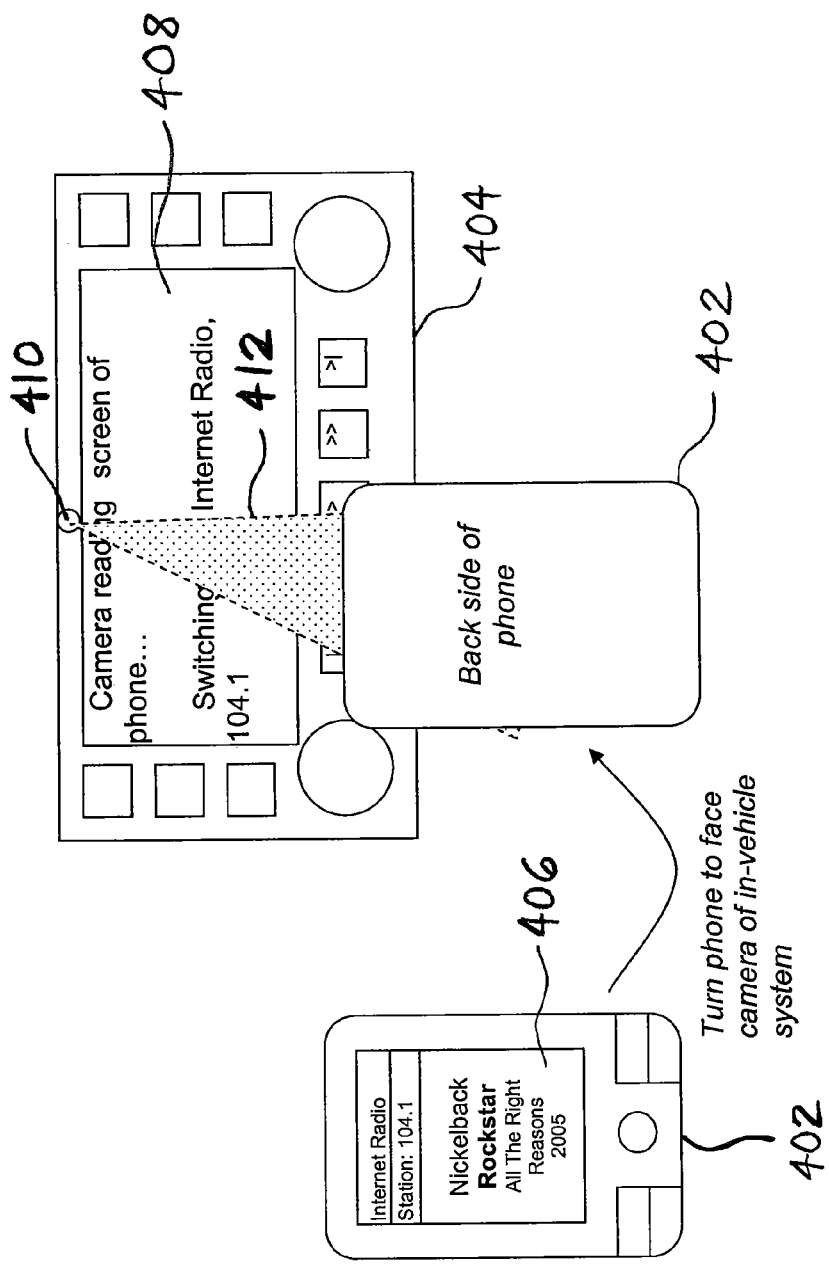
FIG. 4 is an illustration of a radio station being listened to on a mobile phone being tuned to by an in-vehicle system according to one embodiment of the present invention.

As yet another example of how the system of the invention may be used, the system may tune the radio of an in-vehicle system 404 to the radio station listened to on a mobile phone 402. As shown in FIG. 4, the user is listening to an internet streaming radio on his mobile phone 402. The screen 406 displays the name (e.g., call letters) and/or broadcast frequency of the currently listened-to radio station and the name, artist, CD and/or year of the current song. Upon entering the car, assume the user wants to tune the internet radio application of his in-vehicle system 404 to the same radio station that his mobile phone 402 is tuned to. In order to initiate this tuning process, the user may hold display screen 406 of his mobile phone 402, which shows the internet radio application (including website, broadcast frequency and/or call letters), in front of his in-vehicle system 404. In one embodiment, immediately above the in-vehicle display screen 408 an optical sensor 410, which may be in the form of a camera, is attached which monitors the environment. Camera 410 may capture images within its field of view 412, analyze the captured images, and thereby detect that the user is holding an object in front of camera 410. Another result of the image analysis may be an identification of the text information displayed on the phone screen 406 and of the graphic information (e.g., geometrical objects) displayed on the screen 406. Based on the content and layout of the text information, the in-vehicle system 404 may determine that the user is listening to radio and may peruse the displayed text information for the name of the currently tuned-to radio station. In-vehicle system 404 may then automatically open the radio application and switch tuning to the radio station that is identified in the phone's on-screen text information. Thus, the user is saved from having to manually perform the steps of tuning the in-vehicle system 404 to the desired radio station.

As yet another example of how the system of the invention may be used, the system may identify applications that are installed in the user's mobile phone and may replicate those applications in his in-vehicle system. A user may have a number of applications installed on his mobile phone. The user's in-vehicle system may also offer to install applications from an online application store. The user may be interested in installing applications on the in-vehicle system for the tasks he is doing most frequently on the phone so he does not have to use the phone while driving, which may demand more of his attention than does the in-vehicle system. However, the user may lack the time that is necessary to research the names of applications available to his in-vehicle system that are similar to the applications on his mobile phone.

In one embodiment of the invention, the in-vehicle system ascertains the applications that are available on the mobile phone by analyzing what is displayed on the screen of the phone, as described above. However, it is possible within the scope of the invention for the transfer of such information to be initiated by any of the above-described approaches for the initiation of the transfer of state information. The in-vehicle system may then provide information related to applications that are available to his in-vehicle system that are similar to the applications on his mobile phone. More particularly, the in-vehicle system may analyze what applications are installed on the phone and may refer to the knowledgebase of the in-vehicle system in order to ascertain which applications available in the in-vehicle system's online store offer similar functionality. The in-vehicle system may then present this list of similar applications that are available in the in-vehicle system's online store to the user, who may then select which of these applications are to be installed. Thus, the user is saved from having to spend time finding and installing applications in the in-vehicle system himself.

The present invention provides several novel features. A first such novel feature is that all inputs entered by the user into the mobile phone and/or into the in-vehicle infotainment system may be transferred to the other one of the mobile phone and the in-vehicle infotainment system. Thus, the user may be enabled to start an activity on one of the two devices, and continue the activity on the other one of the devices. This may save the user from having to manually recreate or restart activities once he enters or leaves the car and switches devices.

A second novel feature of the invention is the use of an in-vehicle infotainment system with a built-in camera. The camera may make it possible for the user to intuitively interact with the in-vehicle system. For example, the user need only hold his phone in front of the camera of the in-vehicle system and the in-vehicle system may use the images captured by the camera to replicate the phone's screen content within the in-vehicle applications.

A third novel feature of the invention is that it enables a transfer of application states between a mobile phone and an in-vehicle system to be initiated by bumping the mobile phone against the in-vehicle system. For example, vibration sensors in the mobile phone and in the in-vehicle system may sense when the phone is bumped into the in-vehicle system. The vibration sensors may respond to the sensed vibration by initiating a wireless or wired transfer of application states between the mobile phone and the in-vehicle system.

A fourth novel feature of the invention is that it may include using XML or HTML with attached Javascript to encode information to be transferred between the devices. This may enable the displaying of the transferred information, and may also enable the user to interact with the transferred information by simply using a web browser. This may be particularly useful if no application is available on the receiving device that can handle the state and activity information.

A fifth novel feature of the invention is that it may enable transferring state information by displaying and recording visual tags such as barcodes on the screen of either the phone or the in-vehicle system. The other device may read the visual tag in order to learn about the device that has the visual tag and its application state.

A sixth novel feature of the invention is that, after transfer of state information is finished, the receiving device may mimic the device/application state of the sending device by finding applications similar to those running on the sending device, opening the found applications, and reproducing the application state of the sending device on the receiving device. The similar applications may be found by the receiving device in an online library that the receiving device has access to.

A seventh novel feature of the invention is that the in-vehicle system may find applications similar not just to those running on the mobile phone, but also similar to those applications that are installed on the mobile phone but not currently running The in-vehicle system may check the online application store in order to find applications to download that are similar to those applications that are installed on the phone.

In one embodiment, the invention may include collecting user input, application and system states, and content of databases on a first device. All the collected information may be transferred from this first device to a second device. The recorded state of the first device may then be replicated on the second device by use of the applications available on the second device. In one embodiment, the first device is a mobile phone and the second device is an in-vehicle infotainment system. In another embodiment, the first device is an in-vehicle infotainment system and the second device is a mobile phone.

In another embodiment, all collected information may be translated into activities with generalized categories for input and database content. The activities may then be used to find matching applications on the second device.

In yet another embodiment, a transfer of state information may be initiated by the user entering input into one of the two devices; plugging a cable into the portable device (i.e., physically connecting both devices); bumping or knocking the two devices together; holding a display screen of one device in front of the camera of the other device; putting the two devices within proximity of each other such that one of the devices can wirelessly detect the presence of the other; or by using in-vehicle sensors (e.g. ignition sensors, door lock/unlock sensors, seat occupancy sensors) to detect that the user is in the car.

In a further embodiment, the direction of transfer of the state information is indicated by: which of the two devices input was most recently entered into; whether a cable has been most recently plugged in or unplugged; which device has its display screen being held in front of the other device's camera; the use of proximity detection techniques to determine whether the two devices are approaching each other or moving away from each other; or the use of in-vehicle sensors to detect whether a user is entering or leaving a car.

In still yet another embodiment, user input, states, database content and activities performed may be transferred using a wireless RF or wired connection. Alternatively, there may be a transfer based on a visual medium by recognition of embedded visual tags, such as barcodes.

In another embodiment, transfer of state information may be implemented by taking a picture of a first device's display screen with a camera of a second device. The recorded picture may be analyzed for the presence of text, objects and shapes. This information may be used to determine the type of application that is being shown on the screen, the user input that is displayed on the screen, and associated activities.

In a still further embodiment, a second device uses the received user input, states, database content and activities of a first device to find applications that can reproduce the first device's state. If several available applications match an application being used on a first device, then the user can be prompted to decide which application to use. Alternatively, the application used most frequently by user or the most popular application in the online application store may be chosen.

In yet another embodiment, if no application is installed in a second device that can reproduce the first device's state, then matching applications are searched for in an online store for the second device. Found matching applications can be installed in the second device. The found or installed application may be displayed on the screen of the second device. The received user input and database content may be entered into the application and databases on the second device, thereby reproducing the first device's state on the second device.

In a particular embodiment, the invention enables a user who begins writing an email on a mobile phone to transfer the state of the mobile phone to the in-vehicle system so that the user may continue writing the email within the car. In another particular embodiment, a user may operate an internet browser on his mobile phone and transfer the open browser windows and browsing history to an in-vehicle system so that the user may continue his browsing session on the in-vehicle system. In yet another particular embodiment, a user may listen to a radio station on his phone and transfer information identifying the radio station to the in-vehicle system such that the car radio may be automatically tuned to the same radio station that the mobile phone is tuned to. In still another embodiment, applications installed on the mobile phone are detected by or communicated to the in-vehicle system, and the in-vehicle system replicates and installs the applications in the car.

The invention has been described herein in some instances as applying to the transfer of state information from a mobile phone to an in-vehicle system. However, it is to be understood that this is based on the arbitrary assumption that the user is entering the vehicle. The invention and the embodiments described herein are equally applicable to the transfer of state information from an in-vehicle system to a mobile phone in the case that the user is exiting the vehicle.

The invention has also been described herein as applying to a mobile phone. However, the invention may be applicable more generally to any type of personal electronic device.

Figure 5:
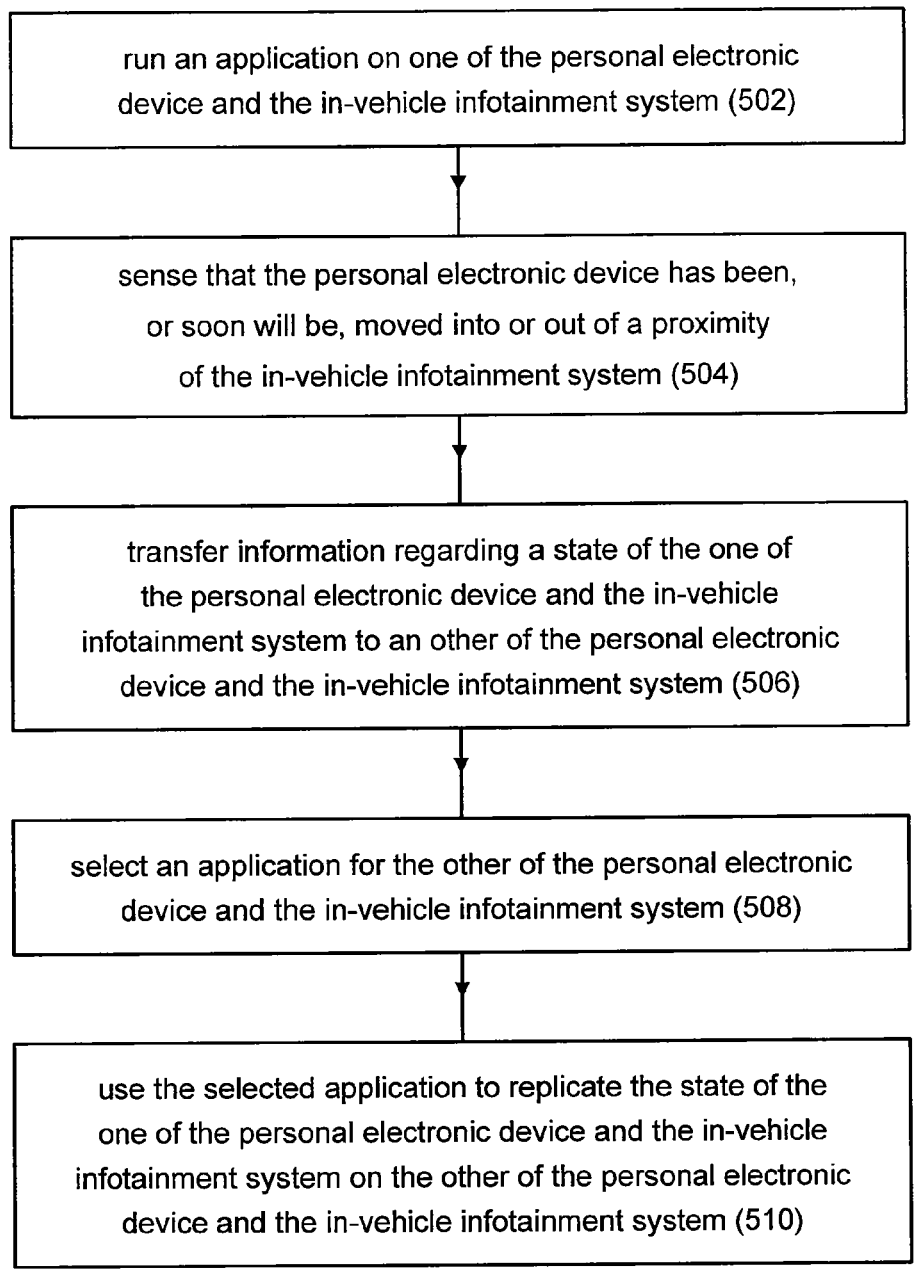
FIG. 5 is a flow chart illustrating one embodiment of a method of operating a personal electronic device and an in-vehicle infotainment system according to the present invention.

One embodiment of a method 500 of the present invention for operating a personal electronic device and an in-vehicle infotainment system is illustrated in FIG. 5. In a first step 502, an application is run on one of the personal electronic device and the in-vehicle infotainment system. For example, in FIGS. 2-4, an email application, a web browsing application, and a radio application are respectively illustrated as being run on a mobile phone.

In a next step 504, it is sensed that the personal electronic device has been, or soon will be, moved into or out of a proximity of the in-vehicle infotainment system. The user may take some positive action that indicates that a mobile phone is being, or will be, moved into or out of a vehicle, and this action may be sensed. For example, the user may press a dedicated pushbutton on the mobile phone or on the in-vehicle infotainment system when he is moving the phone into or out of the vehicle. Alternatively, the user may plug in or unplug a cable that connects the phone to the in-vehicle system, tap the phone against the housing of the in-vehicle system, or hold the screen of the phone in front of the camera of the in-vehicle system. As another alternative, some other action by the user may be sensed that enables the system to indirectly detect that the phone is being moved into or out of the car. For example, the user may turn the ignition switch on or off, lock or unlock the car doors, turn on the in-vehicle system, or adjust the electronic seat adjustment mechanism. As yet another alternative, the movement of the phone into or out of the car may be automatically sensed by the in-vehicle system, or vice versa. For example, one of the devices may transmit a low power RF beacon signal that is received by the other device. Or, one device can scan for an RFID tag, Bluetooth ID or WiFi address of the other device.

Next, in step 506, information regarding a state of the one of the personal electronic device and the in-vehicle infotainment system is transferred to an other of the personal electronic device and the in-vehicle infotainment system. For example, an identity of an application being run on the phone, user inputs entered into the phone, input elements used to enter the inputs, time stamps associated with the inputs, and identities of fields in which the inputs have been entered may be transferred from the phone to the in-vehicle system. In one embodiment, the information is transferred via wireless RF means. In another embodiment, the information is transferred visually via a display screen of the phone and a camera of the in-vehicle system.

In step 508, an application is selected for the other of the personal electronic device and the in-vehicle infotainment system. For example, after the in-vehicle system receives or determines an application that the phone is running, the in-vehicle system may determine whether the in-vehicle system has access to the same or a similar application. If not, the in-vehicle system may download via the internet the application or a substitute application from an on-line store.

In a final step 510, the selected application is used to replicate the state of the one of the personal electronic device and the in-vehicle infotainment system on the other of the personal electronic device and the in-vehicle infotainment system. For example, in the embodiment of FIG. 2, in-vehicle system 204 uses an email application and the transferred state information to replicate on system 204 the email composing activity on phone 202. In the embodiment of FIG. 3, in-vehicle system 304 uses a web browsing application and the transferred state information to replicate on system 304 the web browsing activity on phone 302. Finally, in the embodiment of FIG. 4, in-vehicle system 404 uses a radio tuning application and the transferred state information to replicate on system 404 the radio tuning activity on phone 402.

Figure 6:
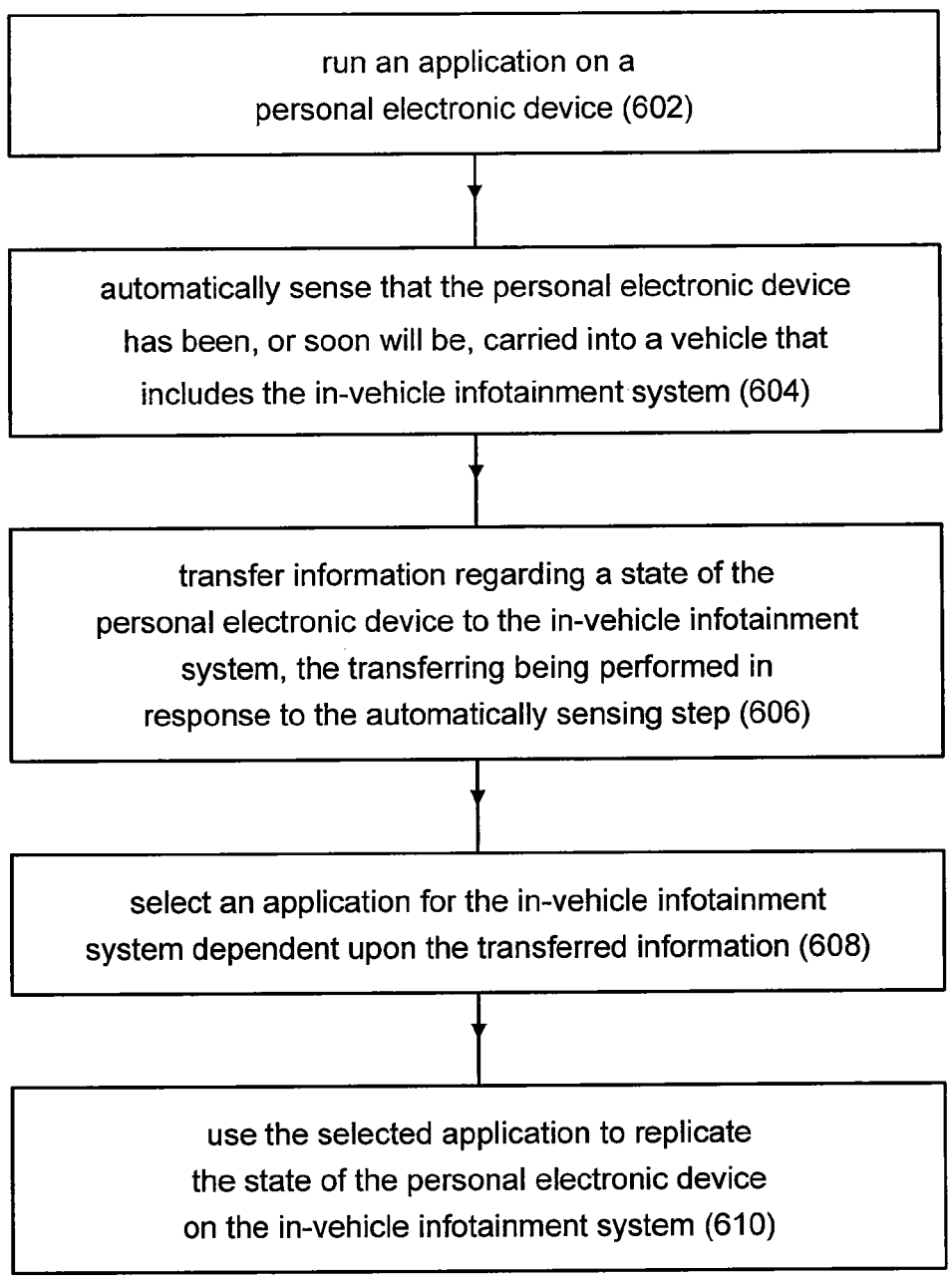
FIG. 6 is a flow chart illustrating another embodiment of a method of operating a personal electronic device and an in-vehicle infotainment system according to the present invention.

Yet another embodiment of a method 600 of the present invention for operating a personal electronic device and an in-vehicle infotainment system is illustrated in FIG. 6. In a first step 602, an application is run on a personal electronic device. For example, in FIGS. 2-4, an email application, a web browsing application, and a radio application are respectively illustrated as being run on a mobile phone.

In a next step 604, it is automatically sensed that the personal electronic device has been, or soon will be, carried into a vehicle that includes the in-vehicle infotainment system. For example, the movement of the phone into or out of the car may be automatically sensed by the in-vehicle system. In a particular embodiment, one of the phone and the in-vehicle system may transmit a low power RF beacon signal that is received by the other of the phone and the in-vehicle system. Alternatively, one of the phone and the in-vehicle system can scan for an RFID tag, Bluetooth ID or WiFi address of the other of the phone and the in-vehicle system.

Next, in step 606, information regarding a state of the personal electronic device is transferred to the in-vehicle infotainment system in response to the automatically sensing step. For example, in response to sensing that a phone is being brought into the vehicle, an identity of an application being run on the phone, user inputs entered into the phone, input elements used to enter the inputs, time stamps associated with the inputs, and identities of fields in which the inputs have been entered may be transferred from the phone to the in-vehicle system. In one embodiment, the information is transferred via a wireless RF protocol that is understood by both devices. In another embodiment, the information is transferred visually via a display screen of the phone and a camera of the in-vehicle system. It is also possible within the scope of the invention for the phone to make the state information available to the in-vehicle system on the internet. It is further possible for the phone to transfer the state information to the in-vehicle system via infrared signals.

In step 608, an application is selected for the in-vehicle infotainment system dependent upon the transferred information. For example, after the in-vehicle system receives or determines from the transferred information an identity of an application that the phone is running, the in-vehicle system may determine whether the in-vehicle system has access to the same or a similar application. If not, the in-vehicle system may download via the internet the application or a substitute application from an on-line store. That is, if the phone is running an email application, then the in-vehicle system may retrieve or download the same email application or a compatible email application.

In a final step 610, the selected application is used to replicate the state of the personal electronic device on the in-vehicle infotainment system. For example, in the embodiment of FIG. 2, in-vehicle system 204 uses an email application and the transferred state information to replicate the state of phone 202 on system 204. In the embodiment of FIG. 3, in-vehicle system 304 uses a web browsing application and the transferred state information to replicate the state of phone 302 on system 304. Finally, in the embodiment of FIG. 4, in-vehicle system 404 uses a radio tuning application and the transferred state information to replicate the state of phone 402 on system 404.

Figure 7:
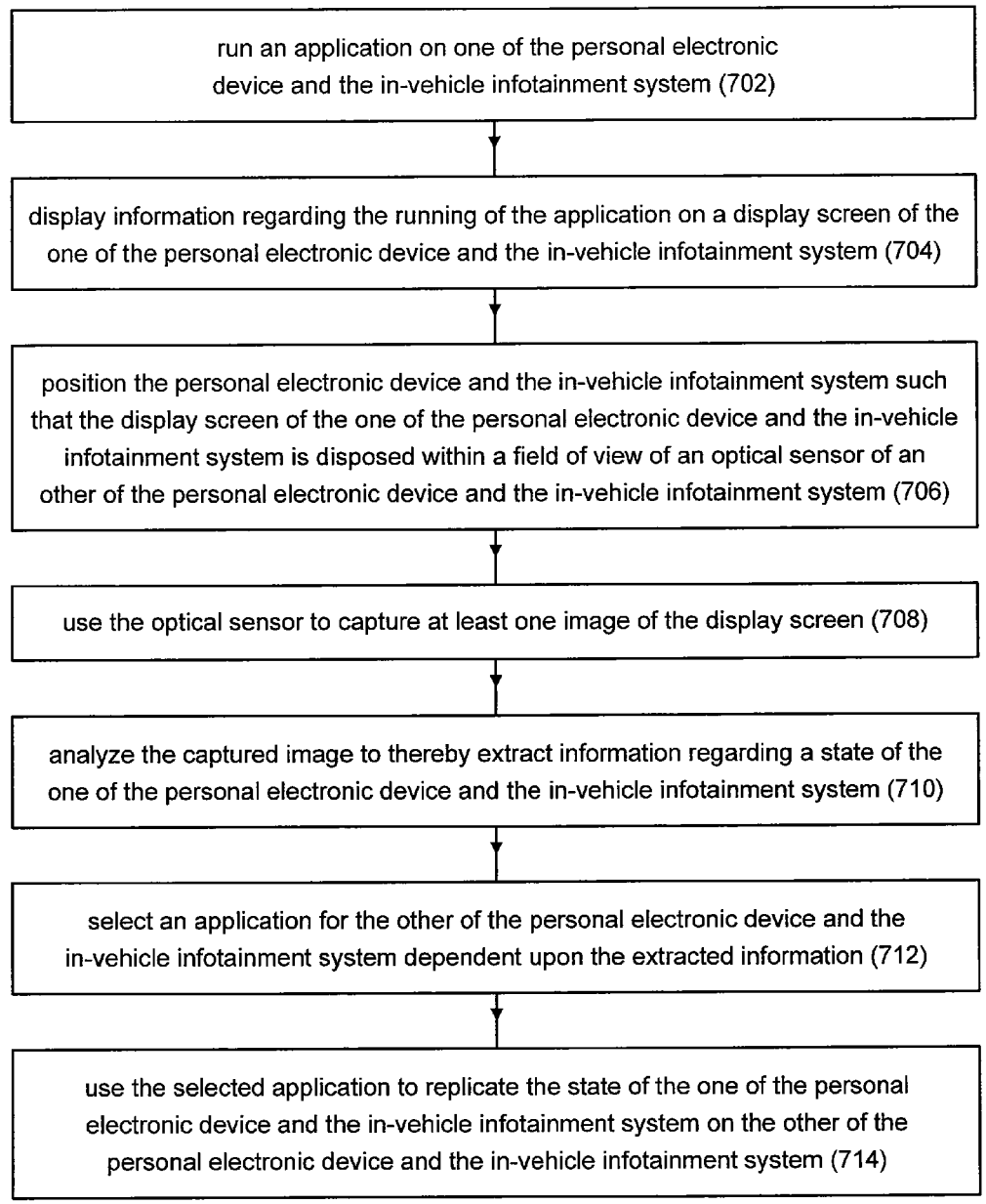
FIG. 7 is a flow chart illustrating yet another embodiment of a method of operating a personal electronic device and an in-vehicle infotainment system according to the present invention.

Yet another embodiment of a method 700 of the present invention for operating a personal electronic device and an in-vehicle infotainment system is illustrated in FIG. 7. In a first step 702, an application is run on one of the personal electronic device and the in-vehicle infotainment system. For example, a navigation application may be run on an in-vehicle infotainment system while the vehicle is en route to a destination. The navigation application may provide navigation information including maps and turn-by-turn directions from the user's current location to the destination. The navigation information may cover both a first portion of the trip on which the user drives a car and a second portion of the trip on which the user is on foot. For example, the navigation information may cover a driving trip to a city coupled with a walking tour of historic landmarks within the city. As another example, the navigation information may cover a driving trip to a national or state park as well as maps and text directions for hiking trails within the park.

In a second step 704, information regarding the running of the application is displayed on a display screen of the one of the personal electronic device and the in-vehicle infotainment system. Continuing the navigation example, the display screen of the in-vehicle navigation system may display maps and/or text information regarding the current trip that the user is taking The on-screen text information may include a starting location and an ending location for the trip. In one embodiment, the starting and ending locations are expressed as numeric longitudinal and latitudinal coordinates.

In a next step 706, the personal electronic device and the in-vehicle infotainment system are positioned such that the display screen of the one of the personal electronic device and the in-vehicle infotainment system is disposed within a field of view of an optical sensor of an other of the personal electronic device and the in-vehicle infotainment system. In the navigation example, the user may hold his phone such that the camera of the phone is pointed at the display screen of the in-vehicle infotainment system. The user may bring the phone close enough to the in-vehicle display screen that the display screen occupies a majority of the field-of-view of the camera.

Next, in step 708, the optical sensor may be used to capture at least one image of the display screen. That is, the camera of the phone may capture an image of the navigation information displayed on the display screen of the in-vehicle system.

In step 710, the captured image is analyzed to thereby extract information regarding a state of the one of the personal electronic device and the in-vehicle infotainment system. In one embodiment, the phone includes character recognition software that reads the text navigation information displayed on the screen as well as graphic recognition software that can read graphic map information. After recognizing the text and graphic information in the captured image, the phone may extract the starting and ending points of the trip, the details of the recommended route, and perhaps the current location of the user. In one embodiment, however, the current location of the user may be determined in real time by the phone using its own GPS resources, and this real time location information may be identified within, and in correspondence with, the graphic and text information captured from the vehicle's display screen.

In step 712, an application is selected for the other of the personal electronic device and the in-vehicle infotainment system dependent upon the extracted information. For example, based upon the extracted information being in the form of navigation information, a navigation application may be opened by or downloaded onto the phone, wherein the selected navigation application is at least compatible with the navigation information captured from the display screen.

In a final step 714, the selected application is used to replicate the state of one of the personal electronic device and the in-vehicle infotainment system on the other of the personal electronic device and the in-vehicle infotainment system. For example, the mobile phone may recreate on the display screen of the phone the map and text navigation information that is displayed on the vehicle's display screen. Further, by running the navigation application that was selected in step 712, and by updating the current location of the phone by use of its GPS resources, the map and text navigation information displayed on the screen of the phone may be continuously updated.

The invention has been described above in some embodiments as including only a one way transfer of state information from one device to another. However, the invention may be equally applicable to a two way transfer of state information between two devices. That is, the two devices may swap applications while still "holding the user's place" in each of the applications. For example, assume the user downloads and stores navigation information into his mobile phone for a particular car trip that he is planning Further assume that he is later driving in his car and using his in-vehicle system for text messaging when he suddenly has a need for the navigation information. Because he considers the navigation information more important or needing more of his attention than the text messaging, he would like to access the navigation information on the superior user interface of the in-vehicle system without having to interrupt the text messaging. According to the invention, after bringing up the navigation application and trip information on his phone, the user may speak an oral command, press a pushbutton, or manually enter a command into one or both of the two devices in order to cause the devices to swap their applications. Thus, the navigation application may be presented on the in-vehicle system and the current state of the text messaging may be presented on the mobile phone. The two way transfer of state information and the swapping of the states of the two devices may be effected by any of the techniques described above with regard to one way transfers.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating a personal electronic device and an in-vehicle infotainment system, the method comprising the steps of:

running an application on one of the personal electronic device and the in-vehicle infotainment system;

displaying information regarding the running of the application on a display screen of the one of the personal electronic device and the in-vehicle infotainment system;

positioning the personal electronic device and the in-vehicle infotainment system such that the display screen of the one of the personal electronic device and the in-vehicle infotainment system is disposed within a field of view of an optical sensor of an other of the personal electronic device and the in-vehicle infotainment system;

using the optical sensor to capture at least one image of the display screen;

analyzing the captured image to thereby extract information regarding a state of the one of the personal electronic device and the in-vehicle infotainment system;

selecting an application for the other of the personal electronic device and the in-vehicle infotainment system, the selecting being dependent upon the extracted information; and using the selected application to replicate the state of the one of the personal electronic device and the in-vehicle infotainment system on the other of the personal electronic device and the in-vehicle infotainment system.

2. The method of claim 1 comprising the further step of recognizing text content and/or objects on the display screen.

3. The method of claim 1 wherein the optical sensor comprises a video camera.

4. The method of claim 1 comprising the further step of using the optical sensor to search for an identification tag, a bar code, or a specific image on the one of the personal electronic device and the in-vehicle infotainment system.

5. The method of claim 1 comprising the further step of analyzing the captured image in order to determine an activity being performed by a user.

6. The method of claim 5 wherein the selecting step is dependent upon the determined activity being performed by the user.

* * * * *